(12) United States Patent
Tian

(10) Patent No.: US 10,891,838 B2
(45) Date of Patent: Jan. 12, 2021

(54) DETECTING DEVICE AND CONTROL SYSTEM WITH SUCH DETECTING DEVICE

(71) Applicant: Carrier Corporation, Palm Beach Gardens, FL (US)

(72) Inventor: LingHao Tian, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/612,530

(22) PCT Filed: Apr. 11, 2018

(86) PCT No.: PCT/US2018/027099
§ 371 (c)(1),
(2) Date: Nov. 11, 2019

(87) PCT Pub. No.: WO2018/208419
PCT Pub. Date: Nov. 15, 2018

(65) Prior Publication Data
US 2020/0202688 A1 Jun. 25, 2020

(30) Foreign Application Priority Data

May 10, 2017 (CN) .................... 2017 2 0513048 U

(51) Int. Cl.
*G08B 13/26* (2006.01)
*G08B 13/193* (2006.01)
(Continued)

(52) U.S. Cl.
CPC ............. *G08B 13/193* (2013.01); *G02B 3/08* (2013.01); *G08B 13/191* (2013.01); *G08B 13/19626* (2013.01); *G08B 29/183* (2013.01)

(58) Field of Classification Search
CPC ......... G08B 13/193; G08B 13/19; G01J 5/62; G01J 5/0025; G01J 5/34; Y01S 250/01
See application file for complete search history.

(56) References Cited

U.S. PATENT DOCUMENTS 6,044,632 A    4/2000  Schmalz et al.
6,469,625 B1 * 10/2002  Tomooka ............ G08B 29/046
                                                              250/342
(Continued)

FOREIGN PATENT DOCUMENTS

CN    200965718 Y    10/2007
CN    200972458 Y    11/2007
(Continued)

OTHER PUBLICATIONS

Deshmukh, Abhisek et al., "Improvised-PIR Sensor for Stationery and Motional Human Detection", International J. of Advanced Research in Electrical, Electronics and Instrumentation Engineering, vol. 4, Issue 10, Oct. 2015, 5 pages.
(Continued)

*Primary Examiner* — Toan N Pham
(74) *Attorney, Agent, or Firm* — Cantor Colburn LLP

(57) ABSTRACT

The present application provides a detection apparatus and a control system, wherein the detection apparatus comprises a passive infrared sensor and a Fresnel lens provided on the passive infrared sensor, and wherein the detection apparatus further comprises a rotation unit, the rotation unit being capable of driving the passive infrared sensor and the Fresnel lens to rotate together. The detection apparatus of the present application can be used for controlling lamplight, air conditioner, heating and ventilation in a building or can be used for security, etc.

13 Claims, 3 Drawing Sheets

(51) Int. Cl.
*G02B 3/08* (2006.01)
*G08B 13/191* (2006.01)
*G08B 13/196* (2006.01)
*G08B 29/18* (2006.01)

(56) References Cited

U.S. PATENT DOCUMENTS

| | | | |
|---|---|---|---|
| 6,604,022 | B2 | 8/2003 | Parker et al. |
| 8,809,788 | B2 | 8/2014 | Covaro |
| 8,901,496 | B2 | 12/2014 | Aurongzeb et al. |
| 8,941,078 | B2 | 1/2015 | Tantillo |
| 2009/0014654 | A1* | 1/2009 | Zhevelev .............. G01J 5/0846 250/339.02 |
| 2016/0320239 | A1 | 11/2016 | Yoon |
| 2019/0259258 | A1* | 8/2019 | Morita ................. G08B 13/193 |
| 2019/0323897 | A1* | 10/2019 | Wang ................... G01J 5/0025 |

FOREIGN PATENT DOCUMENTS

| | | |
|---|---|---|
| CN | 201149330 Y | 11/2008 |
| CN | 101285710 B | 12/2010 |
| CN | 201707454 U | 1/2011 |
| CN | 201957306 U | 8/2011 |
| CN | 201983853 U | 9/2011 |
| CN | 201983863 U | 9/2011 |
| CN | 101866020 B | 9/2012 |
| CN | 202818467 U | 3/2013 |
| CN | 103135142 A | 6/2013 |
| CN | 203164439 U | 8/2013 |
| CN | 102590884 B | 11/2013 |
| CN | 102183795 B | 12/2013 |
| CN | 102510640 B | 2/2014 |
| CN | 102510601 B | 4/2014 |
| CN | 103728028 A | 4/2014 |
| CN | 103729626 A | 4/2014 |
| CN | 203734648 U | 7/2014 |
| CN | 203981279 U | 12/2014 |
| CN | 104266309 A | 1/2015 |
| CN | 104280134 A | 1/2015 |
| CN | 104422524 A | 3/2015 |
| CN | 104697117 A | 6/2015 |
| CN | 103197354 B | 8/2015 |
| CN | 205049760 U | 2/2016 |
| CN | 103399351 B | 8/2016 |
| CN | 104698727 B | 1/2017 |
| EP | 2259035 A1 | 12/2010 |
| EP | 3159709 A1 | 4/2017 |

OTHER PUBLICATIONS

International Search Report and Written Opinion for application PCT/ US2018/027099, dated Jul. 20, 2018, 12 pages.
Sun, Qingquan et al., "Static Human Detection and Scenario Recognition via Wearable Thermal Sensing System", MDPI Computers, published Jan. 20, 2017, 11 pages.

* cited by examiner

DETECTING DEVICE AND CONTROL SYSTEM WITH SUCH DETECTING DEVICE

TECHNICAL FIELD

The present application relates to a passive infrared detection apparatus; and more particularly, the present application relates to a passive infrared detection apparatus for detecting a human being in a building and a control system having such a detection apparatus.

BACKGROUND ART

A passive infrared sensor is also referred to as a PIR sensor, and it has been widely used in buildings due to advantages such as privacy and low costs. The passive infrared sensor can be used for detecting a human being in a building for the purpose of security or control, for example, realizing purposes of security, energy saving, etc. Compared to a camera sensor, the passive infrared sensor has lower costs and only recognizes infrared signals, thus protecting privacy.

A common passive infrared sensor comprises a single passive infrared sensing unit and a Fresnel lens at its front end. The passive infrared sensing unit will produce a voltage based on a change in the radiation intensity, so as to output a signal; and the Fresnel lens is used for converging infrared rays with specific wavelengths, for example infrared radiation emitted by a human body, to the passive infrared sensing unit, increasing the scope of detection of the passive infrared sensing unit.

SUMMARY OF UTILITY MODEL

The aim of the present application is to solve or at least alleviate the problems in the prior art.

According to one aspect of the present application, a detection apparatus is provided. The detection apparatus comprises: a passive infrared sensor and a Fresnel lens provided on the passive infrared sensor. Here, the detection apparatus further comprises a rotation unit, the rotation unit being capable of driving the passive infrared sensor and the Fresnel lens to rotate together.

According to another aspect of the present application, a control system is provided. The control system comprises a detection apparatus according to various embodiments of the present application.

BRIEF DESCRIPTION OF THE DRAWINGS

Referring to the drawings, the disclosure of the present utility model would be easy to understand. A person skilled in the art would easily understand that these drawings are merely for illustrative purposes and are not intended to limit the scope of protection of the present utility model. Additionally, similar numbers in the drawings are used for indicating similar components, and in the drawings.

DETAILED DESCRIPTION

It would be easily understood that a person of ordinary skill in the art can purpose multiple alternative constructions and implementation manners without altering the essential spirit of the present utility model according to the technical solutions of the present utility model. Therefore, the following particular embodiments and accompanied drawings are merely exemplary explanation of the technical solutions of the present utility model and should not be considered as the entirety of the present utility model or be considered as constrictions or limitations to the technical solutions of the present utility model.

Orientation phases such as "up", "down", "left", "right", "front", "back," "front side", "back side", "top", "bottom" or the like mentioned or may be mentioned in the specification are defined relative to the constructions shown in the various accompanying drawings, are relative concepts, and thus may accordingly be varied according to their different locations and different usage stages. Therefore, these or other orientation phases should not be construed as limiting either.

Figure 1:
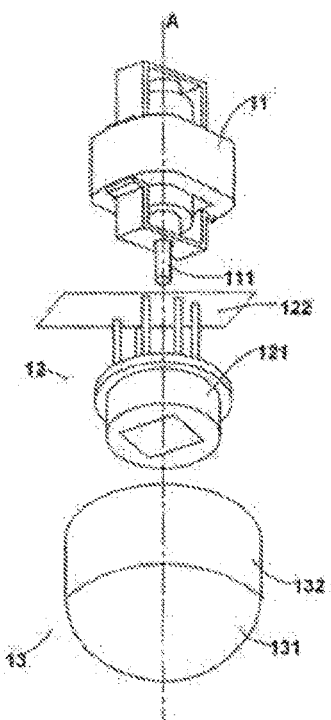
FIG. 1 shows an exploded view of a detection apparatus according to an embodiment of the present application.

Firstly refer to FIG. 1, which shows a detection apparatus based on a passive infrared sensor according to one embodiment of the present application. The detection apparatus mainly comprises: a passive infrared sensor 12; a Fresnel lens 13, arranged on the passive infrared sensor 12 and intended for selectively converging, to the passive infrared sensor 12, infrared radiation emitted by a detected object for example a human being; and a rotation unit 11. The passive infrared sensor 12 and the Fresnel lens 13 can both be directly or indirectly connected to the rotation unit 11, for example an output shaft 111 of the rotation unit 11, so that the rotation unit 11 can drive the passive infrared sensor 12 and the Fresnel lens 13 to rotate together. In some embodiments, the passive infrared sensor 12 and the Fresnel lens 13 are arranged coaxially with the output shaft 111 of the rotation unit 11 along an axis A.

The rotation unit 11 can be any apparatus that can drive the passive infrared sensor 12 and the Fresnel lens 13 to rotate; in some embodiments, as shown in the drawings, the rotation unit 11 can comprise a motor, for example a servo motor, and the rotation or stop of or the rotation rate during rotation of the motor can be controlled. In some embodiments, the rotation unit 11 can further comprise a deceleration mechanism connected with the motor, to reduce an output rotation rate of the rotation unit. Although not shown, in some embodiments, the passive infrared sensor 12 and the Fresnel lens 13 can be respectively connected to a base; subsequently, the base comprising the passive infrared sensor 12 and the Fresnel lens 13 can be mounted to the output shaft of the rotation unit 11, so that the entirety comprising the passive infrared sensor 12 and the Fresnel lens 13 rotates together with the output shaft of the rotation unit 11. Of course, the manner of connecting the passive infrared sensor 12 and the Fresnel lens 13 to the rotation unit 11 is not limited to the way described in the drawings and above; and any connection mode that can realize the effect that the passive infrared sensor 12 and the Fresnel lens 13 rotate together with the rotation unit 11 can be used.

In some embodiments, the passive infrared sensor 12 comprises a single passive infrared sensing unit 121 and a control circuit board 122 connected to the passive infrared sensing unit. The passive infrared sensing unit 121 is a sensor based on the pyroelectric effect which can generate charges upon a temperature change. The temperature change may be caused by infrared radiation. The control circuit board 122 is connected with the passive infrared sensing unit 121, so as to collect a voltage signal caused by the charges generated by the passive infrared sensing unit 121 and realizes the purpose of control based on the voltage signal.

Figure 2:
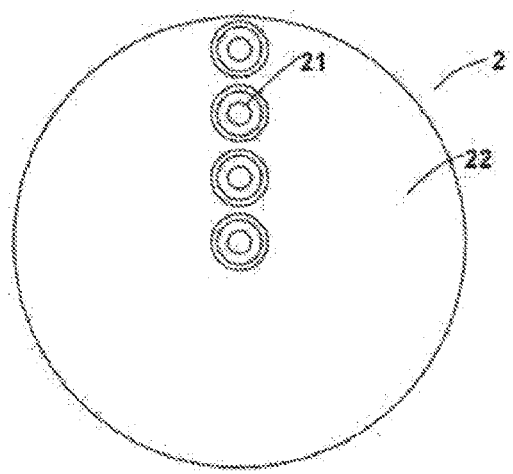
FIG. 2 shows a particular pattern of an embodiment of a Fresnel lens for the detection apparatus of the present application.
Figure 3:
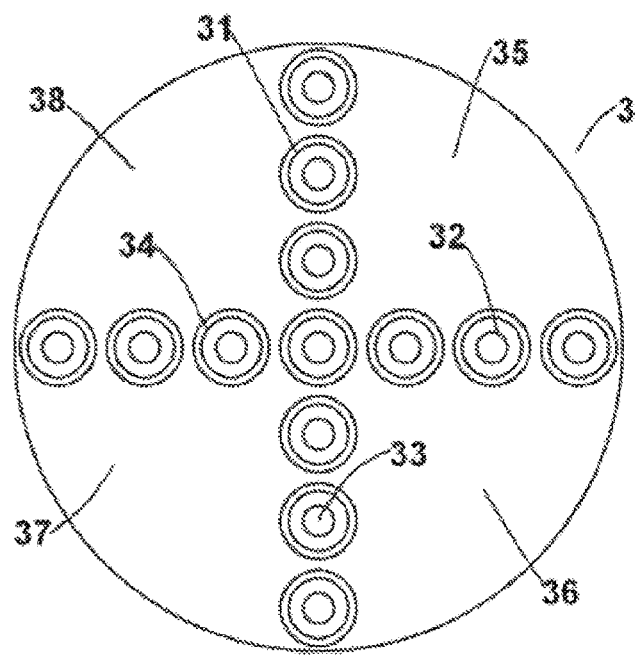
FIG. 3 shows another particular pattern of an embodiment of a Fresnel lens for the detection apparatus of the present application.

In some embodiments, the Fresnel lens 13 comprises an operation region 131 at a lower end and a part 132 at an upper side for enclosing the passive infrared sensor 12. FIG. 2 and FIG. 3 show a pattern of an embodiment of the operation region of the Fresnel lens. In some embodiments, the operation region of the Fresnel lens comprises at least one radial sensitive zone 21. In the embodiment shown in FIG. 2, the operation region 2 of the Fresnel lens comprises one radial sensitive zone 21 and a blind zone 22. In the embodiment shown in FIG. 3, the operation region 3 of the Fresnel lens comprises four radial sensitive zones 31, 32, 33 and 34. The four radial sensitive zones 31, 32, 33 and 34 are separated by blind zones 35, 36, 37 and 38, and any two adjacent radial sensitive zones form an included angle of 90 degree, so as to form a cross sensitive zone pattern. It should be understood that the number of radial sensitive zones can be adjusted according to practical demands, for example, two, three, five, etc. radial sensitive zones can be selected; and the included angles between various sensitive zones can be adjusted according to practical demands, for example, the included angles can be randomly selected between 0° and 360°. In some embodiments, the included angles can be within the range of 60° to 180°. Furthermore, the included angles between the various adjacent radial sensitive zones can be set to be the same or different. The sensitive zones of the Fresnel lens are intended to converge infrared rays within a specific wavelength range irradiated by a detected object onto the sensing unit of the passive infrared sensor. For example, the specific wavelength range can be 8 to 14 μm, and the wavelength range covers the infrared radiation wavelengths emitted by human bodies. Comparatively, the blind zones of the Fresnel lens are intended for preventing the infrared radiation being converged to the sensing unit of the passive infrared sensor.

Figure 4:
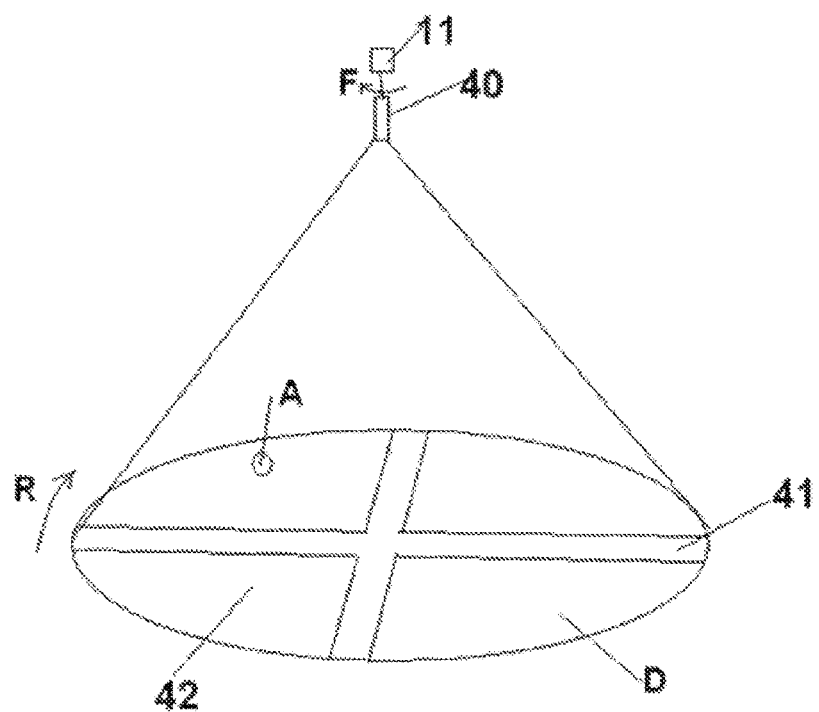
FIG. 4 shows a schematic diagram of the projection of a monitoring scope of the detection apparatus.

FIG. 4 shows a virtual projection of the detection apparatus when the Fresnel lens pattern of FIG. 3 is used. The detection apparatus comprises a rotation unit 11, and the rotation unit can drive the entirety 40 of the passive infrared sensor and the Fresnel lens to rotate along the direction shown by arrow F or a direction opposite thereto. The projected monitoring scope of the detection apparatus onto the ground is denoted by D, and the monitoring scope D comprises a strong sensing zone 41 approximately corresponding to the sensitive zone of the Fresnel lens and a weak sensing zone 42 corresponding to the blind zone of the Fresnel lens. The monitoring scope D, including the strong sensing zone 41 and the weak sensing zone 42 therein, will also rotate along with the rotation unit 11 of the detection apparatus along the direction indicated by the arrow R or a direction opposite thereto.

Figure 5:
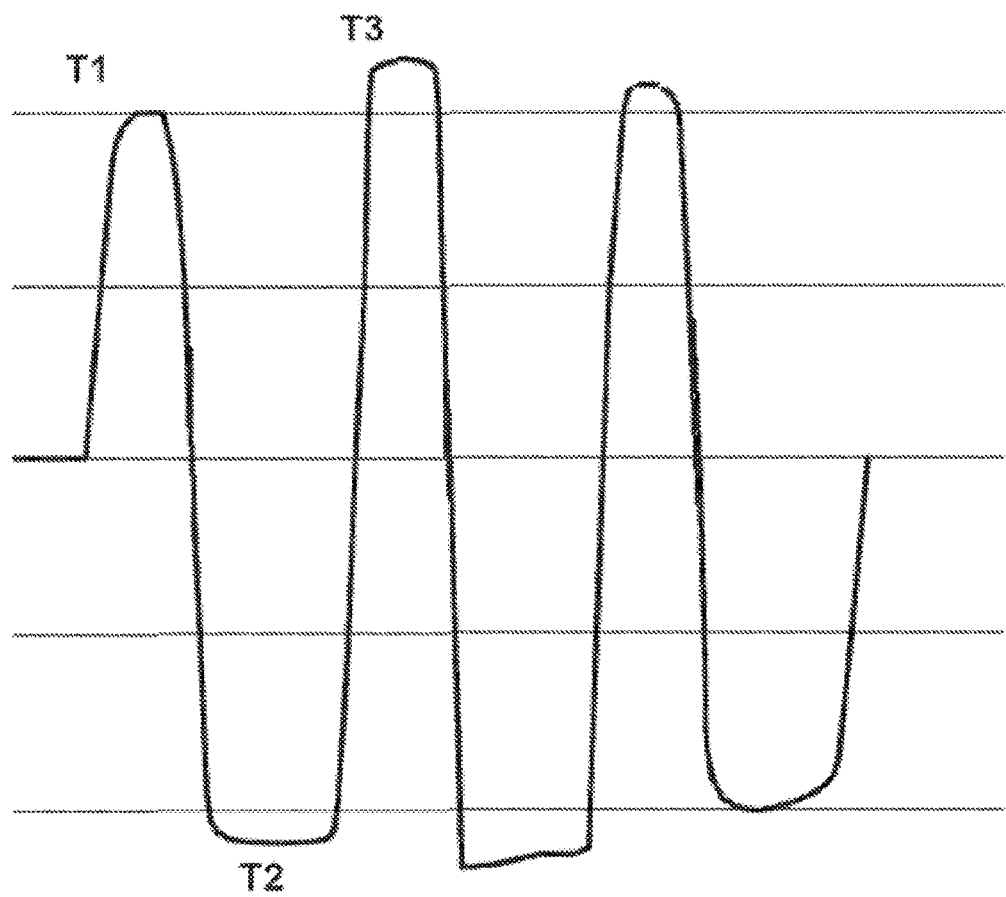
FIG. 5 shows a graph of a voltage signal of the detection apparatus.

Next, a detection approach of the detection apparatus according to the embodiments of the present application will be explained with reference to FIG. 4 and FIG. 5. For a detected object passing through the monitoring scope D (for example a human being), it will go through the strong sensing zone 41 and the weak sensing zone 42 alternately, and a change in the infrared radiation received by the sensing unit of the passive infrared sensor is caused no matter whether the rotation unit 11 is rotating or not; the passive infrared sensing unit will generate charges and a voltage signal due to the change in the infrared radiation and the pyroelectric effect; and whether a detected object exists in the monitoring scope D can be determined based on the voltage signal. For a detected object staying still or substantially still in the monitoring scope D, when the rotation unit 11 rotates, the monitoring scope D rotates accordingly; and the detected object, even staying still at A, will also enter the strong sensing zone 41 and the weak sensing zone 42 alternately. When the detected object at A enters the strong sensing zone 41 from the weak sensing zone 42, the infrared radiation emitted by the detected object is converged to the passive infrared sensing unit, so that the passive infrared sensing unit has an increased temperature and generates charges and generates a voltage signal, for example, a positive voltage; subsequently, when the detected object at A then enters the weak sensing zone 42 from the strong sensing zone 41, the infrared radiation converged to the passive infrared sensing unit disappears, so that the passive infrared sensing unit has a decreased temperature and generates charges and a voltage signal, for example, a negative voltage. As shown in FIG. 5, the positive voltage signal T1 and the negative voltage signal T2 and the positive voltage signal T3 will come up alternately. The passive infrared sensor can determine the existence of a detected object upon sensing one or more voltage signals. Of course, the detection apparatus can be programmed to improve its sensitivity or accuracy. For example, when a higher sensitivity is needed, it can be programmed to determine the existence of a detected object upon sensing a voltage signal for fewer times, and when a higher accuracy is needed, it can be programmed to determine the existence of a detected object upon sensing a voltage signal for more times. Additionally, since the sensitive zones are radially arranged, the voltage signals received within a certain period of time can be increased or reduced by adjusting the rotation rate of the rotation unit 11, thus adjusting the sensitivity of the detection apparatus. Of course, the sensitivity of the detection apparatus can also be adjusted by adjusting the number of, the included angles between radial sensitive zones, etc. Furthermore, it is easily understood that the detection function can be realized by only enabling the infrared radiation received by the passive infrared sensing unit to change, and for all of the embodiments described above, the sensitive zones and the blind zones of the Fresnel lens can both be arranged oppositely to realize the same or substantially the same effect. In some embodiments, the rotation unit of the detection apparatus can rotate intermittently, for example rotating for one or more circles at intervals of A. In some other embodiments, the rotation unit of the detection apparatus can rotate based on the first voltage signal T1, that is to say, the detection apparatus starts to rotate after receiving a first voltage signal.

The detection apparatus according to the present application can be applied to a building to realize the purposes of control and security. The present application also provides a control system comprising a detection apparatus according to various embodiments of the present application; and the control system can control one or more of lamplight, air conditioner, and heating and/or ventilation system in a building based on information fed back by the detection apparatus. The control system can also control an alarm system etc. in the building based on the information fed back by the detection apparatus.

The particular embodiments described above are merely for describing the principle of the present utility model more clearly, where clearly illustrated or described various components enables the principles of the present utility model more easily to understand. Without departing from the scope of the present utility model, a person skilled in the art can easily make various modifications or changes to the present utility model. Therefore, it should be understood that these modifications or changes should all be contained in the scope of patent protection of the present utility model.

The invention claimed is:

1. A detection apparatus, comprising:
a passive infrared sensor and a Fresnel lens provided on the passive infrared sensor, characterized in that the detection apparatus further comprises a rotation unit, the rotation unit being configured to drive the passive infrared sensor and the Fresnel lens to rotate together.

2. The detection apparatus according to claim 1, characterized in that the passive infrared sensor and the Fresnel lens are connected together and mounted on an output shaft of the rotation unit together.

3. The detection apparatus according to claim 2, characterized in that the passive infrared sensor, the Fresnel lens and the output shaft of the rotation unit are coaxially arranged.

4. The detection apparatus according to claim 1, characterized in that the Fresnel lens comprises at least one radial sensitive zone.

5. The detection apparatus according to claim 4, characterized in that the sensitive zone of the Fresnel lens converges infrared radiation with a wavelength range of 8-14 um onto the passive infrared sensor.

6. The detection apparatus according to claim 1, characterized in that the rotation unit rotates intermittently.

7. The detection apparatus according to claim 1, characterized in that the rotation rate of the rotation unit is adjustable.

8. The detection apparatus according to claim 1, characterized in that the rotation unit starts to rotate when the passive infrared sensor receives infrared radiation.

9. A detection apparatus, comprising:
a passive infrared sensor and a Fresnel lens provided on the passive infrared sensor, characterized in that the detection apparatus further comprises a rotation unit, the rotation unit being configured to drive the passive infrared sensor and the Fresnel lens to rotate together:
characterized in that the Fresnel lens comprises a plurality of radial sensitive zones and blind zones arranged alternately.

10. The detection apparatus according to claim 9, characterized in that an angle of 60 degree to 180 degree is included between the sensitive zones or blind zones.

11. The detection apparatus according to claim 9, characterized in that the sensitive zones or blind zones of the Fresnel lens are arranged in a cross pattern.

12. A control system, characterized in that the control system comprises the detection apparatus according to claim 1.

13. The control system according to claim 12, characterized in that the control system controls one or more of lamplight, air conditioner, heating system, ventilation system, and security system in a building based on a signal fed back by the detection apparatus.

* * * * *